(12) United States Patent
Larson

(10) Patent No.: US 8,998,161 B2
(45) Date of Patent: Apr. 7, 2015

(54) APPARATUS FOR HOLDING PORTABLE DEVICES

(71) Applicant: Matthew K. E. Larson, Las Vegas, NV (US)

(72) Inventor: Matthew K. E. Larson, Las Vegas, NV (US)

( * ) Notice: Subject to any disclaimer, the term of this patent is extended or adjusted under 35 U.S.C. 154(b) by 0 days.

(21) Appl. No.: 13/951,055

(22) Filed: Jul. 25, 2013

(65) Prior Publication Data

US 2015/0028175 A1   Jan. 29, 2015

(51) Int. Cl.
*A47B 19/00* (2006.01)
*F16M 11/06* (2006.01)

(52) U.S. Cl.
CPC ..................... *F16M 11/06* (2013.01)

(58) Field of Classification Search
CPC .... H05K 5/0204; G06F 1/679; F16M 11/048; F16M 11/06; F16M 11/04; F16M 11/043; F16M 11/10; F16M 13/00
USPC .................. 248/441.1, 447, 447.1, 451–453, 248/454–453, 457, 458, 322, 323, 324, 325, 248/688, 126, 558, 450, 460, 462, 490, 919, 248/923, 920, 921, 922, 349.1, 444, 479, 248/339; 361/679.06, 679.27; 403/150–159
See application file for complete search history.

(56) References Cited

U.S. PATENT DOCUMENTS

| | | | |
|---|---|---|---|
| 340,987 A * | 5/1886 | Bevoe ........................... 248/455 |
| 639,415 A * | 12/1899 | Lutz ................................ 278/60 |
| 797,208 A * | 8/1905 | Lehman ........................ 248/490 |
| 1,071,428 A * | 8/1913 | Jones ............................. 248/448 |
| 1,113,034 A * | 10/1914 | Miller ............................ 248/470 |
| 1,151,139 A * | 8/1915 | Yosbrink ...................... 15/229.7 |
| 1,938,528 A * | 12/1933 | Marseglia ..................... 248/444 |
| 2,481,107 A * | 9/1949 | Gore ............................. 248/444 |
| 3,351,312 A * | 11/1967 | Ballas ........................... 248/448 |
| 3,365,154 A * | 1/1968 | Hofmann ...................... 248/116 |
| 3,559,934 A * | 2/1971 | Jensen .......................... 248/121 |
| 3,817,486 A * | 6/1974 | Liljequist ..................... 248/467 |
| 4,015,813 A * | 4/1977 | Graham ....................... 248/452 |
| 5,100,098 A * | 3/1992 | Hawkins .................... 248/291.1 |
| 5,152,490 A * | 10/1992 | Deutsch ....................... 248/452 |
| 5,178,354 A * | 1/1993 | Engvall ..................... 248/316.7 |
| 5,651,525 A * | 7/1997 | Yang ............................ 248/456 |
| 5,746,410 A * | 5/1998 | Hung ......................... 248/441.1 |
| 5,887,830 A * | 3/1999 | Liang ............................ 248/37.6 |
| 6,325,346 B1 * | 12/2001 | Chang et al. ............. 248/225.11 |
| 6,665,524 B1 * | 12/2003 | Niemann .................... 455/575.6 |
| 6,776,385 B1 * | 8/2004 | Chang .......................... 248/448 |
| 7,110,802 B1 * | 9/2006 | Kim et al. .................. 455/575.6 |
| 7,129,996 B2 * | 10/2006 | Maruta ......................... 348/794 |
| 7,343,184 B2 * | 3/2008 | Rostami ..................... 455/575.8 |
| 7,478,788 B2 * | 1/2009 | Hsu .............................. 248/371 |

(Continued)

*Primary Examiner* — Nkeisha Smith
(74) *Attorney, Agent, or Firm* — Ariel S. Bentolila; Bay Area IP Group LLC

(57) ABSTRACT

An apparatus comprises a device cradle being configured to removably retain a portable device. The device cradle comprises a u-shaped frame being configured to receive and hold at least three peripheral sides of the portable device. An easel is in engagement with the cradle. The easel comprises lower attachment points configured to engage carrying apparatuses. The easel is further configured to extend upward from a back bottom of the frame. A junction is in engagement with a top of the easel. A hoop structure is in engagement with the junction. The hoop structure is positionable to have a spring-forward tension towards the easel to form a clip in which the clip may engage a structure and the portable device is removably secured to the structure.

16 Claims, 11 Drawing Sheets

(56) References Cited

U.S. PATENT DOCUMENTS

| | | | |
|---|---|---|---|
| 7,612,997 B1* | 11/2009 | Diebel et al. | 361/679.56 |
| 7,708,240 B2* | 5/2010 | Homer et al. | 248/130 |
| 7,735,799 B1* | 6/2010 | Antici | 248/454 |
| 7,821,778 B2* | 10/2010 | Herman | 361/679.01 |
| 7,854,420 B2* | 12/2010 | Depay et al. | 248/316.7 |
| 8,070,026 B2* | 12/2011 | Wadsworth et al. | 224/197 |
| 8,204,561 B2* | 6/2012 | Mongan et al. | 455/575.8 |
| 8,256,734 B1* | 9/2012 | Chen | 248/500 |
| 8,266,834 B2* | 9/2012 | Chen et al. | 40/749 |
| 8,317,138 B1* | 11/2012 | Johnson, Jr. | 248/37.6 |
| 8,403,288 B2* | 3/2013 | Cheng | 248/688 |
| 8,413,943 B1* | 4/2013 | Li | 248/454 |
| 8,459,599 B2* | 6/2013 | Du et al. | 248/181.1 |
| 8,469,322 B1* | 6/2013 | Oxley | 248/74.2 |
| 8,534,617 B2* | 9/2013 | Wang et al. | 248/127 |
| 8,579,246 B2* | 11/2013 | Chang | 248/455 |
| 8,602,304 B2* | 12/2013 | Cohen | 235/449 |
| 8,605,431 B2* | 12/2013 | Cheng et al. | 361/679.56 |
| 8,651,446 B2* | 2/2014 | Lausell | 248/465.1 |
| 2003/0042390 A1* | 3/2003 | Paton | 248/453 |
| 2003/0222848 A1* | 12/2003 | Solomon et al. | 345/156 |
| 2003/0235029 A1* | 12/2003 | Doherty et al. | 361/683 |
| 2005/0247832 A1* | 11/2005 | Cho et al. | 248/133 |
| 2007/0007420 A1* | 1/2007 | Tsang | 248/441.1 |
| 2007/0172310 A1* | 7/2007 | Yang et al. | 403/150 |
| 2007/0228253 A1* | 10/2007 | Yun | 248/688 |
| 2008/0259551 A1* | 10/2008 | Gavenda et al. | 361/684 |
| 2009/0127423 A1* | 5/2009 | Chen et al. | 248/447 |
| 2009/0140119 A1* | 6/2009 | To et al. | 248/455 |
| 2010/0116952 A1* | 5/2010 | Nielsen | 248/157 |
| 2011/0215214 A1* | 9/2011 | Grammer et al. | 248/346.5 |
| 2011/0279959 A1* | 11/2011 | Lopez | 361/679.03 |
| 2012/0025684 A1* | 2/2012 | Trotsky | 312/334.1 |
| 2012/0326003 A1* | 12/2012 | Solow et al. | 248/688 |
| 2013/0170110 A1* | 7/2013 | Lee | 361/679.01 |
| 2013/0181106 A1* | 7/2013 | Lin et al. | 248/463 |
| 2013/0277530 A1* | 10/2013 | Wong | 248/687 |
| 2013/0292288 A1* | 11/2013 | Willes | 206/521 |

* cited by examiner

APPARATUS FOR HOLDING PORTABLE DEVICES

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to clips. More particularly, the invention relates to clips for holding portable devices.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that portable communications devices refer to hand-held or wearable devices. Portable telephones are also carried, or worn, on a belt, or in a pocket. Portable devices have also become usable when worn. For example, most walkie talkies come with a Voice Operated Xmit capability so that they will work hands-free, when used with a wearable microphone. Many telephones also feature an earpiece that allows the phone to be worn and used hands-free.

Typically, mobile phone accessories include any hardware or software that is not integral to the operation of a mobile phone as designed by the manufacturer. Cell phone holders are chiefly configured to hold the mobile phone vertically. The mobile phone is removed from the holder to operate.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A illustrates an exemplary holding apparatus 100 holding an exemplary portable device in a horizontal orientation, FIG. 4B illustrates an exemplary holding apparatus 100 holding an exemplary portable device in a vertical orientation, FIG. 4C illustrates an exemplary holding apparatus 100 holding an exemplary portable device in a secondary horizontal orientation, and FIG. 4D illustrates an exemplary holding apparatus 100 holding an exemplary portable device mounted to a surface with an exemplary mounting bracket 405, in accordance with an embodiment of the present invention;

FIG. 5A illustrates an external view of exemplary T-junction 120 components, FIG. 5B illustrates an internal view of exemplary T-junction 120 components, FIG. 5C illustrates an external view of an exemplary lower T-junction 122, and FIG. 5D illustrates a transparent view of an exemplary T-junction 120, in accordance with an embodiment of the present invention;

FIG. 7A illustrates an exemplary holding apparatus 100 holding an exemplary portable device mounted to a surface with an exemplary mounting bracket 405, and FIG. 7B illustrates an exemplary holding apparatus 100 mounted on a vehicle dashboard with an exemplary hoop structure 125 serving as a stand, in accordance with an embodiment of the present invention;

FIG. 8A illustrates a top view of an exemplary mounting bracket 405, FIG. 8B illustrates a detailed perspective view of an exemplary mounting bracket 405, and FIG. 8C illustrates a sectioned view of an exemplary mounting bracket 405, in accordance with an embodiment of the present invention.

DETAILED DESCRIPTION OF SOME EMBODIMENTS

Figure 1:
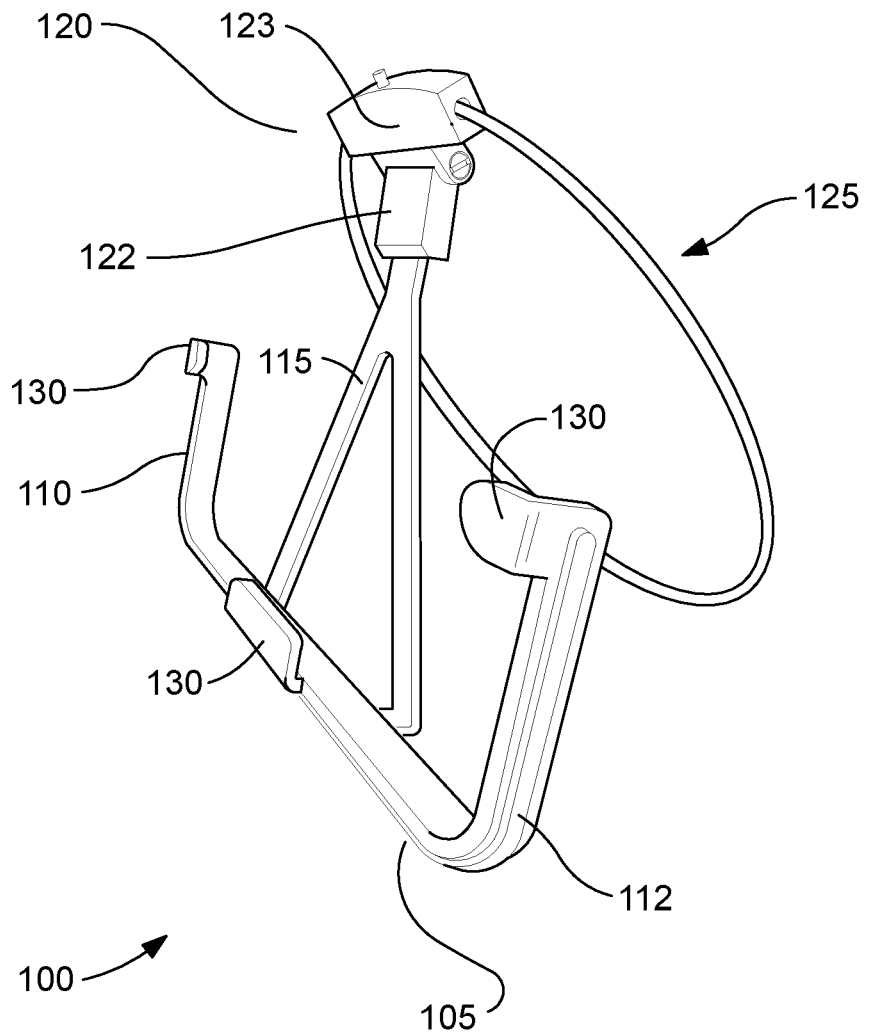
FIG. 1 illustrates an exemplary holding apparatus, in accordance with an embodiment of the present invention.

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Embodiments of the present invention may provide means and methods for improved use, storage, and access to portable devices.

FIG. 1 illustrates an exemplary holding apparatus, in accordance with an embodiment of the present invention. In the present embodiment, a device cradle 105 may be configured to receive and hold a portable device. In many embodiments, the device cradle 105 may be composed of any material, including, without limitation, stainless steel, fiberglass, rubber, or plastic. A universal contact liner 110 may be designed to fit inside the device cradle 105. In many embodiments, the universal contact liner 110 may be composed of any material, including, without limitation, rubber. In some embodiments, the universal contact liner 110 may serve a variety of functions, including, without limitation, protecting a portable device and allowing improved access to the portable device. In the present embodiment, the device cradle 105 may have a gap, or slit, 112 through which the universal contact liner 110 may protrude. A protruding section of the universal contact liner 110 may be pressed by a user to make contact with various components of a contained portable device, including, without limitation, buttons, knobs, and switches. In a non-limiting example, a hosted portable device may be a smartphone, and the smartphone may have various buttons which may be situated along the smartphone's edges or sides. In the present non-limiting example, the smartphone may fit into the device cradle 105 and upon the universal contact liner 110 such that the smartphone's button may be situated above the gap 112 of the device cradle 105 where the universal contact liner 110 may be protruding. Further, in the present non-limiting example, a user may press the universal contact liner 110 at an area where the universal contact liner 110 may be covering a button. Still further, in the present non-limiting example, pushing the area of the universal contact liner 110 below the button may cause the button to be activated. In the present embodiment, an easel 115 may connect to the device cradle 105. The easel 115 may have attachment points 116, shown if FIG. 2, for any type of carrying apparatus, including, without limitation, a holster, a paper pad or a cradle. In the present embodiment, attachment points 116 may join with device cradle 105. In alternative embodiments, device cradle 105 may be exchangeable with other cradles of different sizes and/or shapes.

In the present embodiment three cradle tabs 130, one tab on each vertical wall and one tab on the horizontal base of device cradle 105, in conjunction with the easel 115 and the main body of device cradle 105 hold the hosted portable device in place. The cradle tabs 130 are large enough to help secure the portable device within the cradle but small enough not to interfere with the screen or operating controls/buttons of the portable device. In some embodiments cradle tabs 130 may also provide a location for the product's name and logo such as, but not limited to, the front surface of the tab on the horizontal base of device cradle 105. In the present embodiment universal contact liner 110 may protect the portable device from contacting the cradle tabs.

In the present embodiment, the easel 115 may join with a T-junction 120. In some embodiments, the T-junction 120 may consist of a lower T-junction 122 and an upper T-junction 123. In the present embodiment, the upper T-junction 123 may join with a hoop structure 125. In many embodiments, the hoop structure 125 may be in any shape, including, without limitation, a circle, an oval, a rectangle, a triangle, or a star. In many embodiments, the hoop structure 125 may join with the upper T-junction 123 at a slight angle toward the easel 115. In some of these embodiments, the slight angle may cause a spring-forward tension of the hoop structure 125 towards the easel 115. In many embodiments, the T-junction 120 may serve as an adjustable hinge for locking and adjusting the hoop structure 125 and the device cradle 105 to form a clip, a support stand or mounting function. In some embodiments, the holding apparatus 100 may be operable to support a hosted portable device upon an automobile dashboard or suspend it from a vertical surface. In an alternate embodiment, T-junction 120 may include an additional pivot mechanism to enable one or more portions of T-junction 120 to rotate about a vertical axis of the easel 115.

Figure 2:
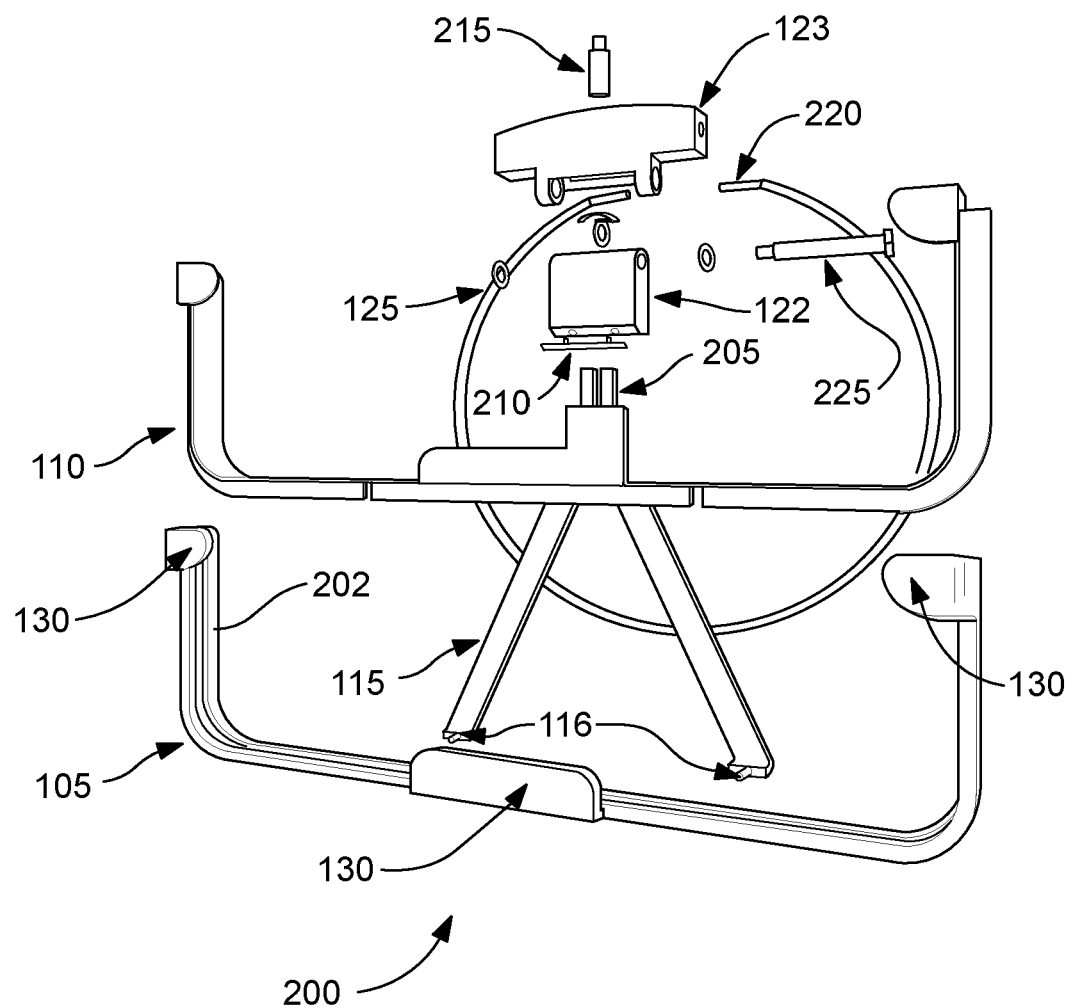
FIG. 2 illustrates a disassembled view of an exemplary holding apparatus 100, in accordance with an embodiment of the present invention.

FIG. 2 illustrates a disassembled view of an exemplary holding apparatus 100, in accordance with an embodiment of the present invention. In the present embodiment, a device cradle 105 is shown separated from a universal contact liner 110. As shown in the present non-limiting example, the universal contact liner 110 may be designed to fit into a receiving area 202 of the device cradle 105. In the present embodiment, an easel 115 may have prongs 205 which may fit into corresponding holes in the lower T-junction 122. A protective piece 210 may also attach to the lower T-junction 122 to protect a device contained in the holding apparatus 100. In some embodiments, the protective piece 210 may be composed of any material, including, without limitation, plastic. In the present embodiment, a plunger 215 may fit into an open channel of the upper T-junction 123. In some embodiments, the plunger 215 may be composed of any material, including, without limitation, acrylonitrile butadiene styrene (ABS). In the present embodiment, the hoop structure 125 may have ends 220 which may fit into corresponding holes in the upper T-junction 123. Further, in the present embodiment, a tension screw 225 may fit into the lower T-junction 122.

Figure 3:
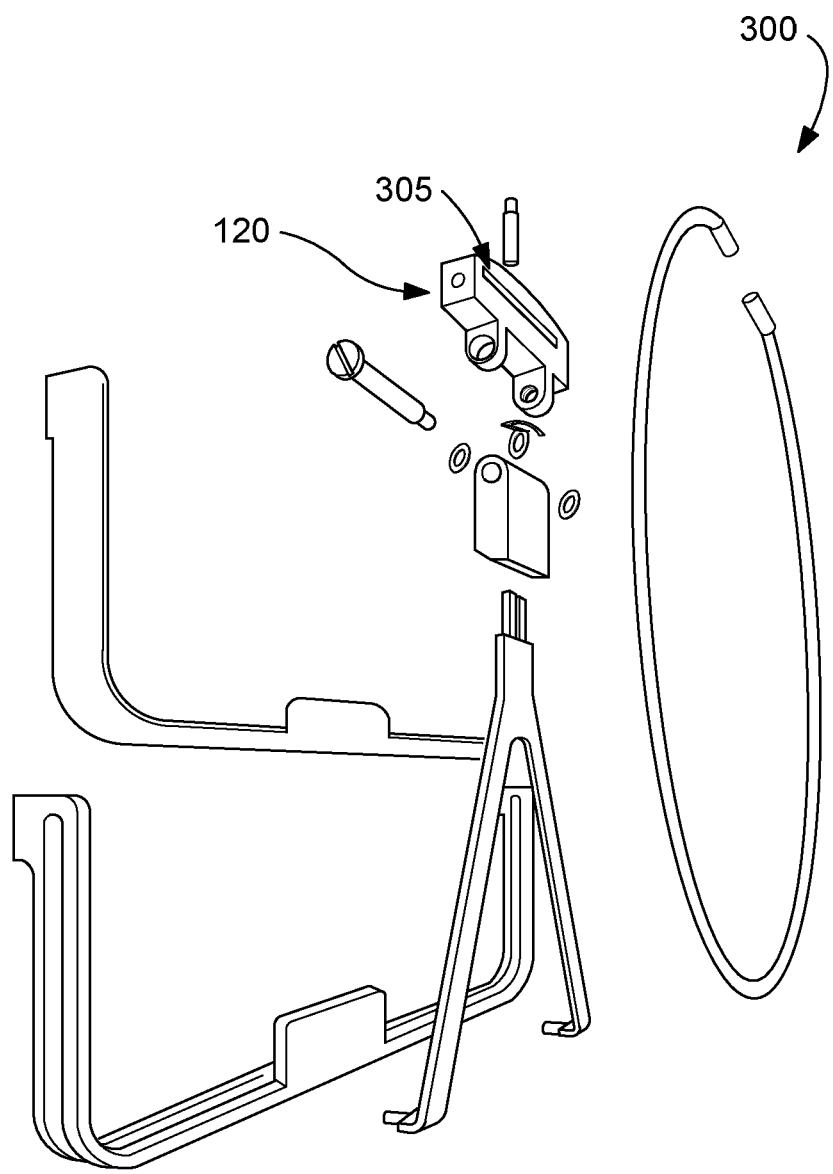
FIG. 3 illustrates another view of a disassembled holding apparatus 100, in accordance with an embodiment of the present invention.

FIG. 3 illustrates another view of a disassembled holding apparatus 100, in accordance with an embodiment of the present invention. In the present embodiment, a rubber stopper 305 may be situated on the T-junction 120 to provide grip to a surface when the holding apparatus 100 is laid down in a manner in which the T-junction 120 may make contact with a surface.

Figure 4A:
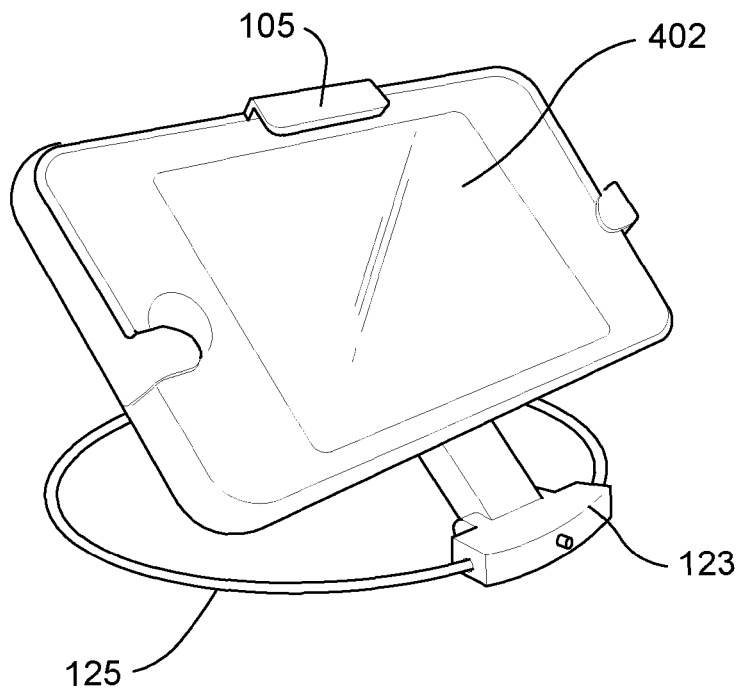
FIGS. 4A, 4B, 4C, and 4D illustrate detailed perspective views of an exemplary holding apparatus 100, where
Figure 4B:
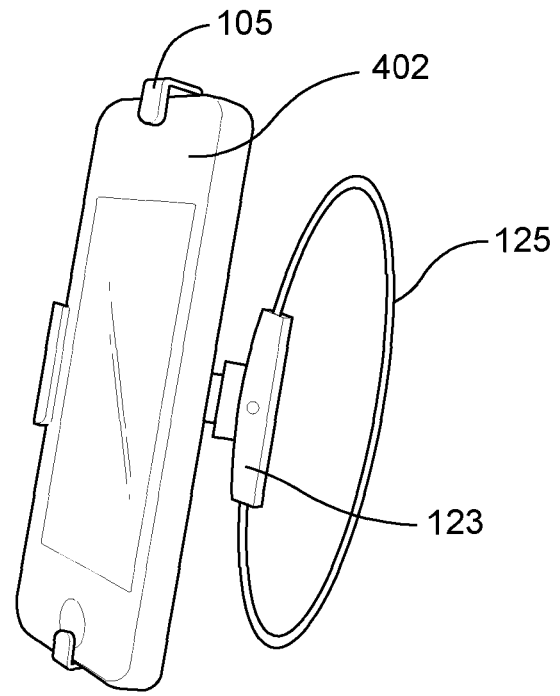
Figure 4C:
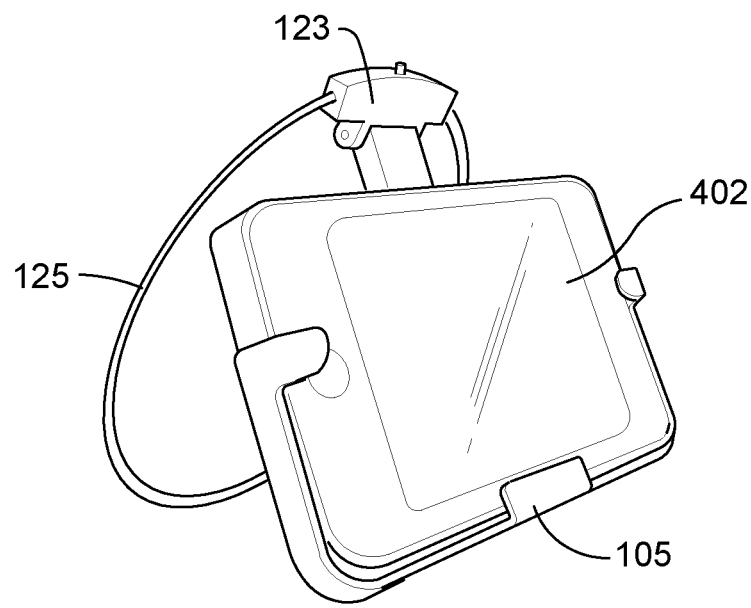
Figure 4D:
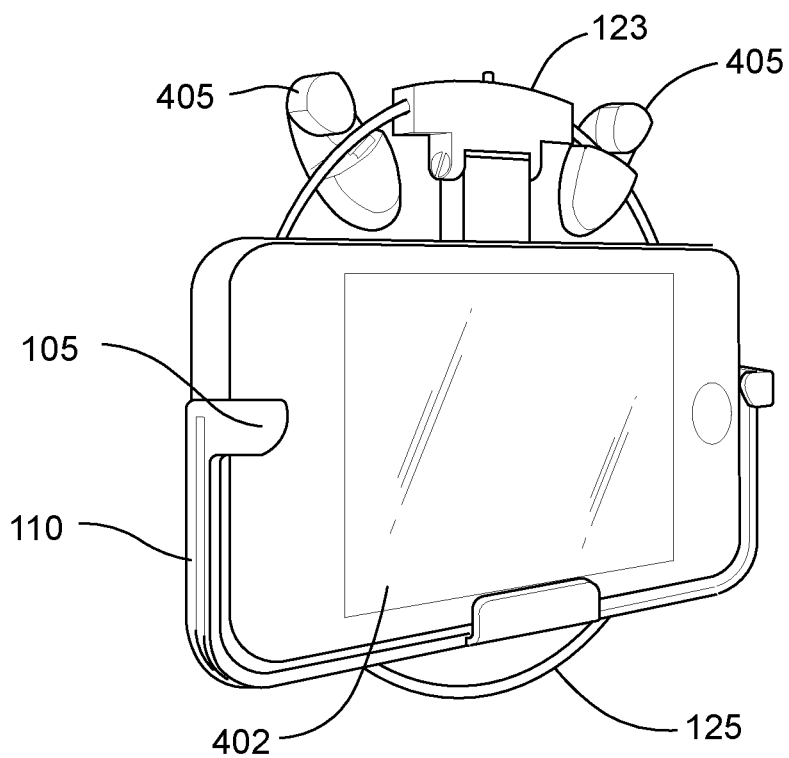

FIGS. 4A, 4B, 4C, and 4D illustrate detailed perspective views of an exemplary holding apparatus 100, where FIG. 4A illustrates an exemplary holding apparatus 100 holding an exemplary portable device in a horizontal orientation, FIG. 4B illustrates an exemplary holding apparatus 100 holding an exemplary portable device in a vertical orientation, FIG. 4C illustrates an exemplary holding apparatus 100 holding an exemplary portable device in a secondary horizontal orientation, and FIG. 4D illustrates an exemplary holding apparatus 100 holding an exemplary portable device mounted to a surface with an exemplary mounting bracket 405, in accordance with an embodiment of the present invention. In the present embodiment, the device cradle 105 may hold and orient a device 402 in a variety of orientations efficacious for operating the device 402. In some embodiments, the universal contact liner 110 may engage components of the device 402 for operation of the device 402. In the present embodiment, a mounting bracket 405 may allow the holding apparatus 100 to be secured to a surface. In some embodiments, any number of mounting brackets 405 may be used, depending on type of structure or surface. In many embodiments, a mounting bracket 405 may be mounted in place via an adhesive on a bottom surface of the mounting bracket 405. In other embodiments, Velcro or any other joining means may be used in place of an adhesive.

Figure 5A:
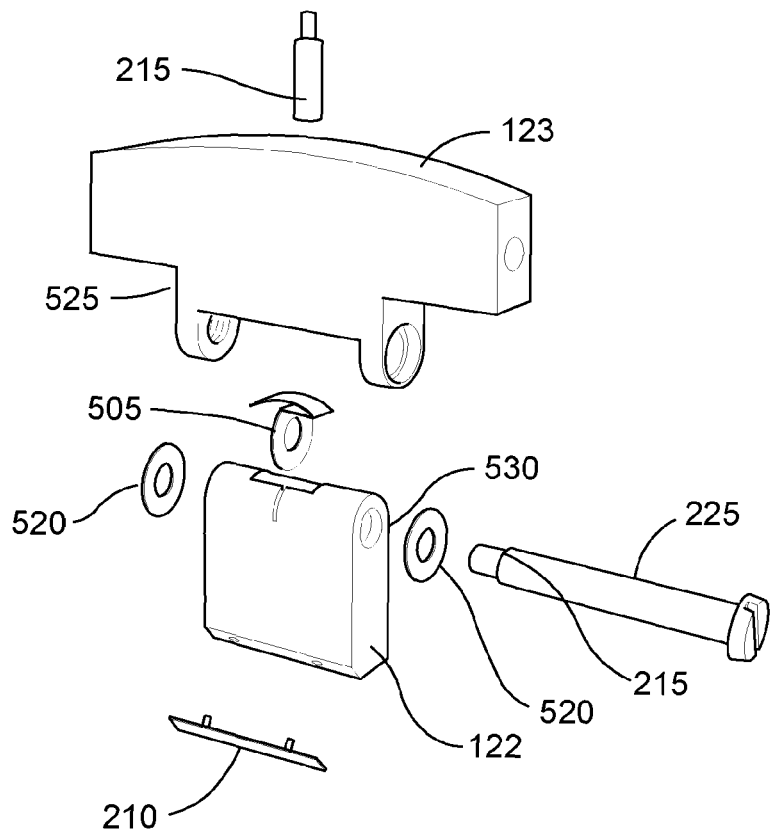
FIGS. 5A, 5B, 5C, and 5D illustrate internal and external components of an exemplary T-junction 120, where
Figure 5B:
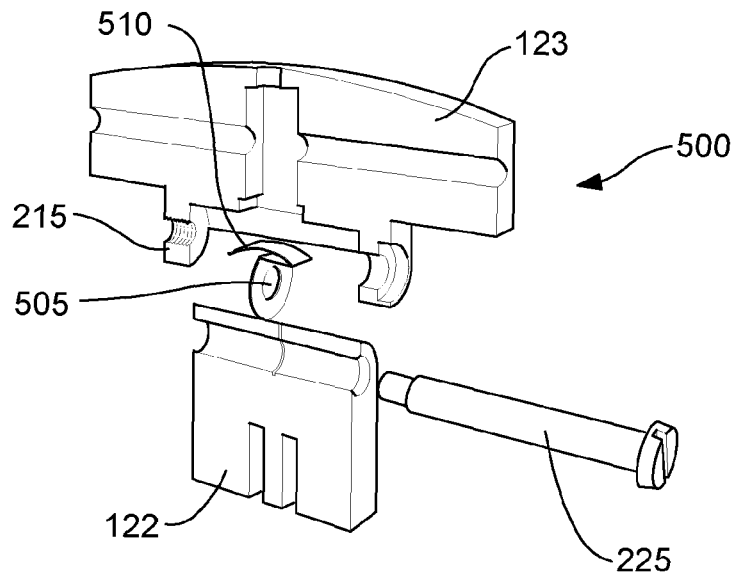
Figure 5C:
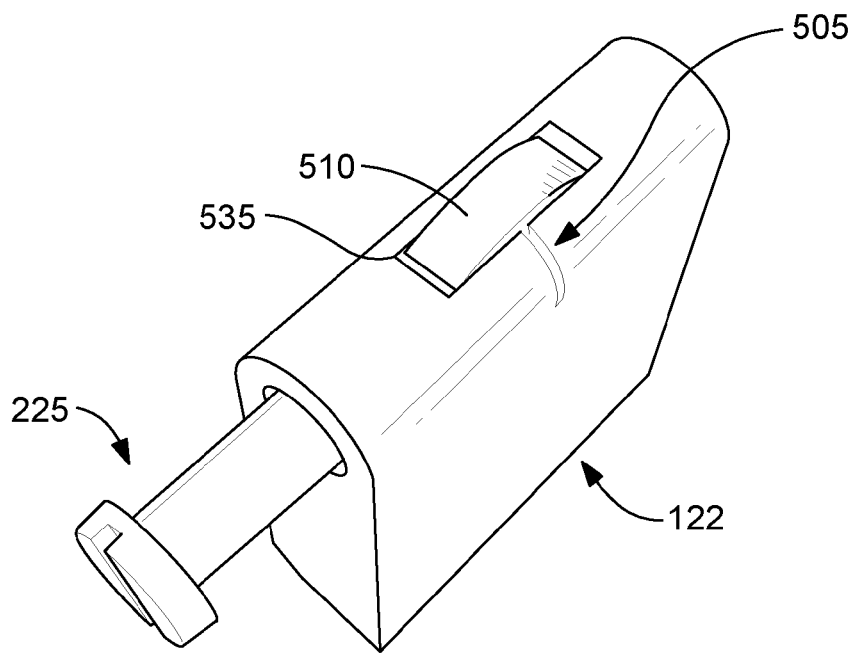
Figure 5D:
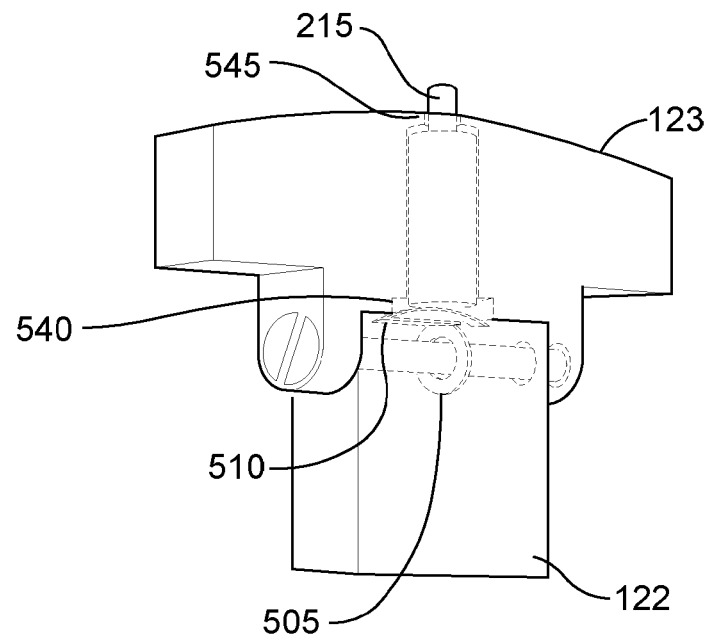

FIGS. 5A, 5B, 5C, and 5D illustrate internal and external components of an exemplary T-junction 120, where FIG. 5A illustrates an external view of exemplary T-junction 120 components, FIG. 5B illustrates an internal view of exemplary T-junction 120 components, FIG. 5C illustrates an external view of an exemplary lower T-junction 122, and FIG. 5D illustrates a transparent view of an exemplary T-junction 120, in accordance with an embodiment of the present invention. In the present embodiment, the plunger 215 may be depressed to contact an arching spring appendage 510 of a washer spring latch 505 in order to allow rotation of the lower T-junction 122 and the upper T-junction 123 when connected. In some embodiments, the plunger 215 may have radius edges to prevent it from frictionally sticking within a hosting chamber of the washer spring latch 505. In the present embodiment, an arching spring appendage 510 of the washer spring latch 505 may fit into a cavity of the upper T-junction 123. In some embodiments, the arching spring appendage 510 may be suitable for locking the T-junction 123 in place. In many embodiments, the plunger 215 may press against the arching spring appendage 510 to enable the T-junction 120 to bend where the lower T-junction 122 connects to the upper T-junction 123. In the present embodiment, the tension screw 225 may have threads 515 to allow for tension adjustment by a user. In many embodiments, the tension screw 225 may fit tightly into the lower T-junction 122 to prevent rattling. In the present embodiment, one or more washers 520 may be placed at a connection point of the tension screw 225 and the lower T-junction.

In some embodiments, the upper T-junction 123 may include two upper apertures 525 that bracket a lower aperture 530 passing through the lower T-junction 122. In some embodiments, the at least one washer 520 may position at an end of either aperture 525. The tension screw 225 may pass through the two upper apertures 525, the lower aperture 530, and the at least one washer 520 to secure the upper T-junction 123 and the lower T-junction 122 together. In some embodiments, a washer spring latch 505 may be disposed to position within a groove in the lower T-junction 122 and around the tension screw 225. Tightness of swivel at a joining section of the upper T-junction 123 and the lower T-junction 122 may then be adjusted by turning the tension screw 225.

In some embodiments, a washer spring latch 505 may be connected to an arching spring appendage 510 and be placed into a lower aperture 530. In the present embodiment, the washer spring latch 505 and the arching spring appendage 510 may be situated under an opening 535 in the lower T-junction 122, such that the arching spring appendage 510 may project out of the lower T-junction 122 and into a cavity 540 in the upper T-junction. Further, in the present embodiment, when the arching spring appendage 510 is situated in the cavity 540 of the upper T-junction 123, the lower T-junction 122 and the upper T-junction 123 may be locked in place. In many embodiments, the plunger 215 may protrude through an opening 545 of the upper T-junction 120. In some of these embodiments, user may press on a protruding section of the plunger 215 so that the plunger 215 may press down on the arching spring appendage 510, allowing the arching spring appendage 510 to disengage from the cavity 540. In other of these embodiments, users may hold down on the protruding section of the plunger 215 to allow sections of the T-junction 120 to pivot. Further, in some of these embodiments, users may release the protruding section of the plunger 215 to stop sections of the T-junction 120 from pivoting. In some embodiments, tightness of the tension screw 225 may determine whether sections of the T-junction 120 may hold a pivoted position and/or at what angle they hold the pivoted position.

In embodiments of the present invention, the T-junction 120 may be configured to join components of the holding apparatus 100, and then position the holding apparatus 100 and a device 402 in a locked position or an unlocked position. In some embodiments, the T-junction 120 may have an upper T-junction 123, the upper T-junction 123 being configured to receive the hoop structure 125. The T-junction may further include a lower T-junction 122. A protective piece 210 may extend from the lower T-junction 122. The protective piece 120 may clip in place to protect from scratches and helps to hold a device 402 in place.

In embodiments of the present invention, the easel 115 may join with the lower T-junction 122. The easel 115 may be configured to receive a device 402. Suitable devices 402 may include, without limitation, a portable device, a communication device, a cellular phone, a laptop, a digital display, and a writing utensil. However, in other embodiments, the easel 115 may be configured to receive and hold any tool or piece of equipment of various sizes and dimensions. In one alternative embodiment, the easel 115 may be operable to telescopically expand and retract to adjust to various types of devices 402. In some alternate embodiments, device cradle 105 may be operable to telescopically expand and retract to adjust to various types of devices 402. In some embodiments, the easel 115 may join with the device cradle 105. A device 402 may slide inside an inner area of the device cradle 105. A gap 112 may run along an exterior longitudinal axis of the device cradle 105. The easel 115 may provide a planar surface area for a device 402 to rest on. In some embodiments, a universal contact liner 110 may protrude through the gap 112 and extend inwardly to engage components of the device, including, without limitation, buttons, switches, and knobs. In this manner, the universal contact liner 110 may extend through the gap 112, providing access to the buttons of the device. In some embodiments, depressing corresponding areas of a device 402 with the universal contact liner 110 may allow a user to operate the device 402. In this manner, the buttons of the device 402 may be accessible in any orientation that the device 402 is placed in the device cradle 105. In alternative embodiments, the universal contact liner 110 may have wiring suitable to allow an external power source or memory device to access a contained device 402. In other alternative embodiments, the universal contact liner 110 may have small gaps or holes in it to allow various wires and cords, including, without limitation, charging cords to pass through and plug into a receptacle on a contained device 402. In some embodiments, a protective piece 210 may at least partially cover an area where the device 402 may contact. In this manner, the device 402 may be protected from damage, including, without limitation, scratches, nicks, and dents. Suitable materials for fabricating the easel 115 may include, without limitation, carbon fiber, fiberglass, flexible steel, tool grade steel, aluminum, rubber, plastic, and foam. In some embodiments, the holding apparatus 100 may be configured to be operable so that placing a thumb at the top of the T-junction 120 along with fingers on the bottom edge of the device, and squeezing, may detach the device 402 from the device cradle 105. Various types of portable device holding apparatuses 100 may be provided by embodiments of the present invention.

In the present embodiment, a holding apparatus 100 may be configured to hold a device 402 in a plurality of orientations during operation and while in storage. The holding apparatus 100 may secure to a variety of structures and surfaces through use of the hoop structure 125 and a mounting bracket 405 and/or mounting brackets 405. In some embodiments, the holding apparatus 100 may hold smartphones and similar portable devices 402 from an eclectic array of structures, including, without limitation, pockets, belts, walls, vertical planes, and vehicle dashboards. In yet another embodiment, the holding apparatus 100 may simultaneously allow for convenient access and hands-free use of the device 402. In some embodiments, the holding apparatus 100 may hold the device 402 in a plurality of orientations and positions while allowing access to button, switches, and knobs on the device 402.

In one embodiment of the present invention, the holding apparatus 100 may include a hoop structure 125 for enclosing or clipping a device 402 to a structure. The hope structure 125 may include without limitation, a loop, a star, a square, and rectangle. The hope structure 125 may be fabricated from materials such as, but not limited to, fiberglass, flex steel, carbon fiber, plastics, laminates, metals, woods, acrylics, aluminum, plexiglass, and/or composites. In some alternate embodiments the hoop structure may be have a textured surface to increase friction or may be coated with a frictional material. In some embodiments, the holding apparatus 100 may use the hoop structure 125 to hang and/or grip onto a structure. However, in other embodiments, the hoop structure 125 may swivel outwardly to form a stand and support the holding apparatus 100 and a device. Those skilled in the art, in light of the present teachings, will recognize that the hoop structure 125 may be sized and shaped so as to minimize contact with, and avoid interfering with the device by looping around and away from the device. In this manner, the hoop structure 125 may secure the device 402 to a structure while minimizing interference with the operation of the device 402 and the structure.

In one embodiment of the present invention, an easel 115 may join with the lower T-junction 122. The easel 115 may be configured to receive a device 402. Suitable devices 402 may include, without limitation, an electronic device, a communication device, a cellular phone, a laptop, a digital display, a writing utensil, and a tool. In some embodiments, the easel 115 may join with a device cradle 105 configured to receive and secure edges of a device 402. A gap 112 may run along an exterior longitudinal axis of the device cradle 105. An easel 115 may provide a planar surface area for the device 402 to rest on. In some embodiments, a universal contact liner 110 may protrude through the gap 112 and extend inwardly to engage components of the device 402, including, without limitation, buttons, switches, and knobs. In this manner, the universal contact liner 110 may extend through the linear gap 112 of the device cradle 105, providing access to the buttons of the device 402. In this manner, the buttons of the device may be accessible in any orientation that the device 402 may be placed inside the device cradle 105 while the device is still in the cradle. In some embodiments, a protective piece 210 may at least partially cover an area where the device 402 may contact. In this manner, the device 402 may be protected from damage, including, without limitation, scratches, nicks, and dents. Suitable materials for fabricating the protective piece 210 may include, without limitation, rubber, plastic, and foam. In some embodiments, the holding apparatus 100 may be configured to be operable so that placing a thumb at the top of the T-junction 120 along with fingers on the bottom edge of the device 402, and squeezing, may detach the device 402 from the device cradle 105.

Those skilled in the art, in light of the present teachings, will recognize that the flexibility of the hoop structure, T-junction 120, and mounting bracket 405 may allow the device inside the holding apparatus 100 to be oriented in a plurality of positions. For example, without limitation, while reading from the device, the device may be placed solely on the hoop structure, forming a desirable angle for easy, hands-free reading. In yet another example, while video conferencing with the device, the device may be oriented vertically, and while reading a map, the device may be oriented horizontally. The T-junction 120 may vary the degree of orientation as desired. The mounting bracket 405 may also secure the device to a ceiling, a vehicle dashboard or vertical wall. From any of these orientations, the buttons, switches, and knobs of the device may be manipulated through the universal contact liner.

In some embodiments, a holding apparatus 100 may be configured to hold a device 402 in a plurality of orientations during operation and while in storage. The holding apparatus 100 may secure to a variety of structures and surfaces through use of the hoop structure 125 and the mounting bracket. In some embodiments, the holding apparatus 100 may hold smartphones and similar portable devices 402 from an eclectic array of structures, including, without limitation, pockets, belts, planar surfaces, and vehicle dashboards. In yet another embodiment, the holding apparatus 100 may simultaneously provide convenient access and hands-free use of the device 402 while the device is securely positioned in a desired area. In yet another embodiment, the holding apparatus 100 may provide a stand that compliments the features of a device 402, including, without limitation, a smartphone, a camera, a video recorder, and an audio recorder. In some embodiments, the holding apparatus 100 may hold the device 402 in a plurality of orientations and positions while allowing access to, without limitation, buttons, switches, and knobs on the device 402. Those skilled in the art, in light of the present teachings, will recognize that allowing the user to orient and position the device 402 to a desired orientation while simultaneously operating the device 402 may allow a user to, in a non-limiting example, maintain better, more professional video projections during teleconference and video interactions. Suitable materials for fabricating the holding apparatus 100 may include, without limitation, aluminum, titanium, steel, fiberglass, polymers, wood, plastics, and tool grade steel. In yet another embodiment, the holding apparatus 100 may utilize synthetic rubber materials, including, without limitation, ethylene propylene diene monomer rubber and butadiene rubber. However, in other embodiments, the holding apparatus 100 may be fabricated in variation in which no synthetic rubber material is included. The holding apparatus 100 may have various colors, including, without limitation, translucent colors. In one embodiment of the present invention, the holding apparatus 100 may have a hoop structure 125 for enclosing or clipping a device 402 to a structure. The hoop structure 125 may take any form, including without limitation, a loop, a star, a square, and rectangle. The hope structure 125 may be fabricated from materials such as, but not limited to, fiberglass, flex steel, carbon fiber, plastics, laminates, metals, woods, acrylics, aluminum, plexiglass, and/or composites. In some embodiments, the holding apparatus 100 may utilize the hoop structure 125 to hang onto a structure. However, in other embodiments, the hoop structure 125 may swing outwardly to form a stand and support the holding apparatus 100 and the device 402. In some embodiments, the holding apparatus 100 may have a T-junction 120 configured to join the hoop structure 125 with the device cradle 105. The T-junction 120 may further position the holding apparatus 100 with the device 402 in a locked position or an unlocked position. Those skilled in the art, in light of the present teachings, will recognize that since the hoop structure 125 may nominally engage the device 402, and the T-junction 120 may only rest on one edge of the device 402, the device 402 may receive sufficient aeration to avoid overheating.

In one embodiment of the present invention, the T-junction 120 may be operable to serve as an adjustable, locking hinge that joins different sections of the holding apparatus 100. The T-junction 120 may be configured to join components of the holding apparatus 100, and then position the holding apparatus 100 and the device 402 in a locked position or an unlocked position. In some embodiments, the T-junction 120 may include an upper T-junction 123 configured to receive the hoop structure 125. The T-junction 120 may further include a lower T-junction 122. The upper T-junction 123 and the lower T-junction 122 may be joined with a tension screw 225 and at least one washer 520. Other mechanisms may include various ratcheting mechanisms, spline and pawl mechanisms, and device that allow for controllable angle adjustment such as bicycle seat apparatuses that allow the seat angle to be adjusted. The tension screw 225 may serve as a hinge between the upper T-junction 123 and the lower T-junction 122. The upper T-junction 123 may include two upper apertures 525 that bracket a lower aperture 530 passing through the lower T-junction 122. In some embodiments, the at least one washer 520 may position at the end of either aperture 525. The tension screw 225 may pass through the two upper apertures, the lower aperture, and the at least one washer to secure the upper T-junction 123 and the lower T-junction 122 together. The tension screw 225 fits tightly through these apertures. In one embodiment of the present invention, the upper T-junction 123 and the lower T-junction 122 may be joined with a tension screw 225 and at least one washer 508. The at least one washer 520 may include, without limitation, a friction washer 520. The tension screw 225 may serve as a hinge between the upper T-junction 123 and the lower T-junction 122. In some embodiments, the upper T-junction 123 may include two upper apertures 525 that bracket a lower aperture 530 passing through the lower T-junction 122. The at least one washer 520 may position at either end of the lower aperture 530. However, in other embodiments, more or less apertures 525 and washers 520 may be utilized. In some embodiments, the tension screw 225 may pass through the two upper apertures 525, the lower aperture 530, and the at least one washer 520 to secure the upper T-junction 123 and the lower T-junction 122 together. In some embodiments, a washer spring latch 505 may be disposed to position within the lower aperture 530 and around the tension screw 225. The tightness of the swing at the hinge may then be adjusted by turning the tension screw in an appropriate direction. In some embodiments, a plunger 215 may be positioned above an apex of the arching spring appendage 510.

Figure 6:
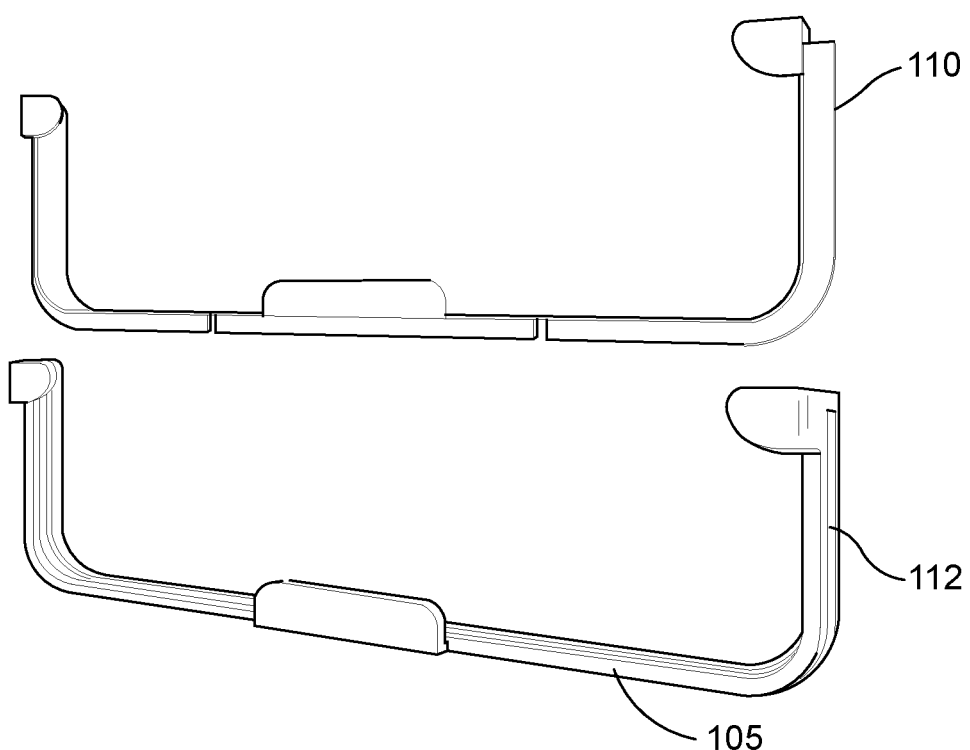
FIG. 6 illustrates a detailed perspective view of an exemplary device cradle 105 in proximity to an exemplary universal contact liner 110, in accordance with an embodiment of the present invention.

FIG. 6 illustrates a detailed perspective view of an exemplary device cradle 105 in proximity to an exemplary universal contact liner 110, in accordance with an embodiment of the present invention. In the present invention, the device cradle 105 may be configured to receive a device 105. Suitable devices may include, without limitation, an electronic device, a communication device, a cellular phone, a laptop, a digital display, and a tool. In some embodiments, the device cradle 105 may be configured to receive and secure the edges of the device 402. A gap 112 may run along an exterior longitudinal axis of the device cradle 105. An easel 115 may provide a planar surface area for the device 402 to rest on. In some embodiments, a universal contact liner 110 may protrude through the gap 112 and extend inwardly to engage components of the device 402, including, without limitation, buttons, switches, and knobs. In this manner, the universal contact liner 110 may extend through the linear gap 112 holding apparatus 100, providing access to the buttons of the device 402. In this manner, the buttons of the device 402 may be accessible in any orientation that the device 402 is placed inside the device cradle 105.

Figure 7A:
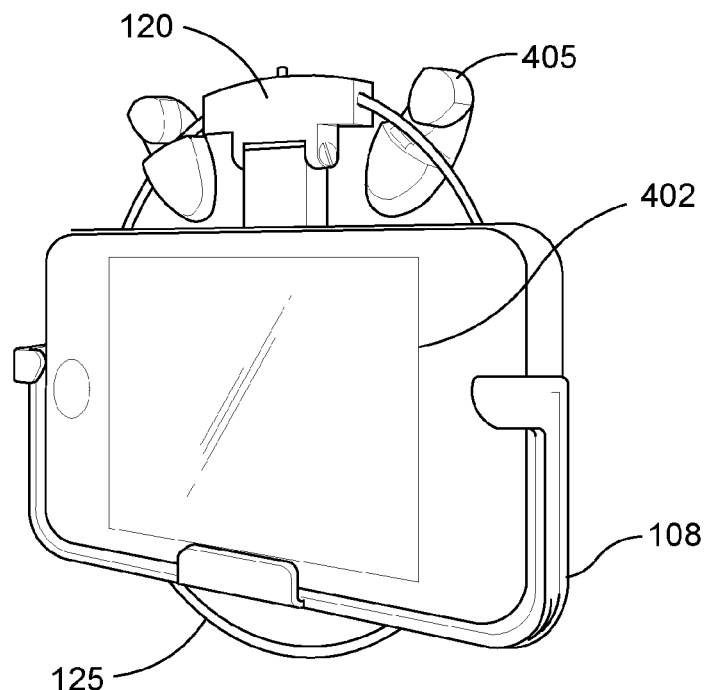
FIGS. 7A and 7B illustrate detailed perspective views of an exemplary holding apparatus 100 mounted on various surfaces, where
Figure 7B:
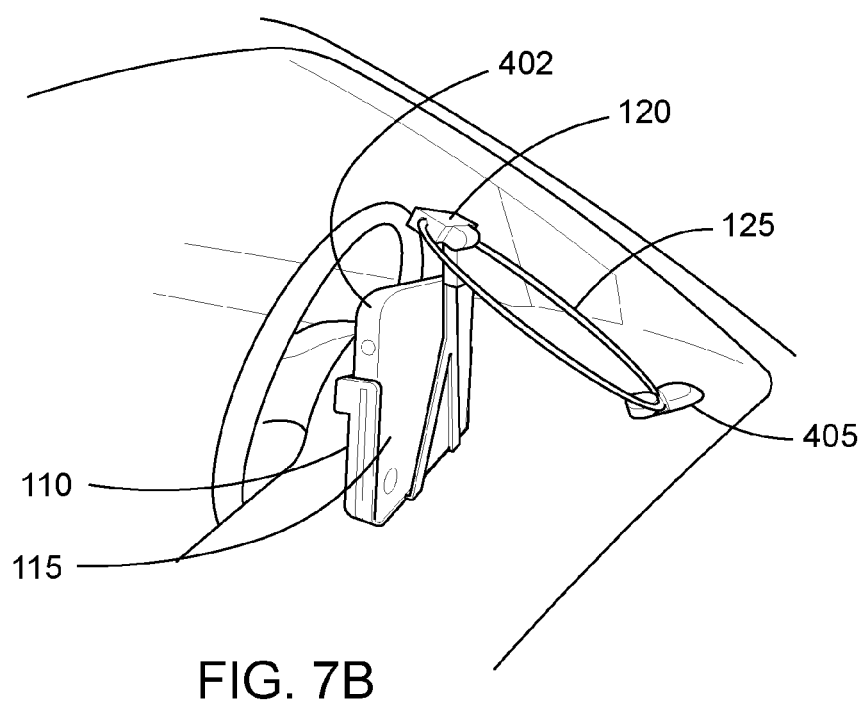

FIGS. 7A and 7B illustrate detailed perspective views of an exemplary holding apparatus 100 mounted on various surfaces, where FIG. 7A illustrates an exemplary holding apparatus 100 holding an exemplary portable device mounted to a surface with an exemplary mounting bracket 405, and FIG. 7B illustrates an exemplary holding apparatus 100 mounted on a vehicle dashboard with an exemplary hoop structure 125 serving as a stand, in accordance with an embodiment of the present invention. In the present invention, flexibility of the hoop structure 125, T-junction 120, and mounting bracket 405 may allow the device 402 inside the holding apparatus 100 to be oriented in a plurality of positions. For example, without limitation, a vehicle dashboard may be inclined at an angle. The T-junction 120 of the holding apparatus 100 may swing to provide a level presentation of the device 402. The T-junction 120 may vary the degree of orientation as desired. The mounting bracket 405 may also secure the device 402 to a ceiling or vertical wall. From any orientation provided by the holding apparatus 100, any buttons, switches, and knobs of the device 402 may be manipulated through the universal contact liner 110.

Figure 8A:
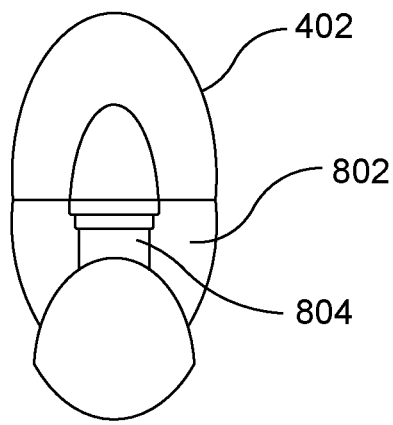
FIGS. 8A, 8B, and 8C illustrate various views of an exemplary mounting bracket 405, where
Figure 8B:
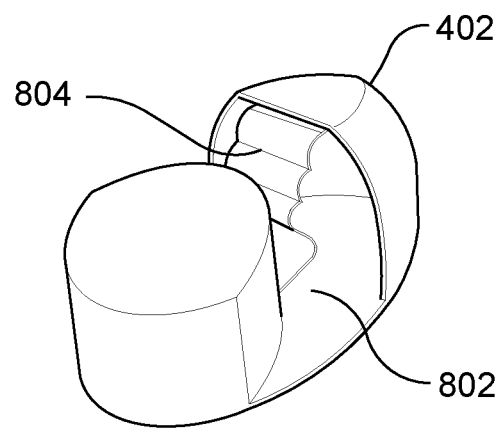
Figure 8C:
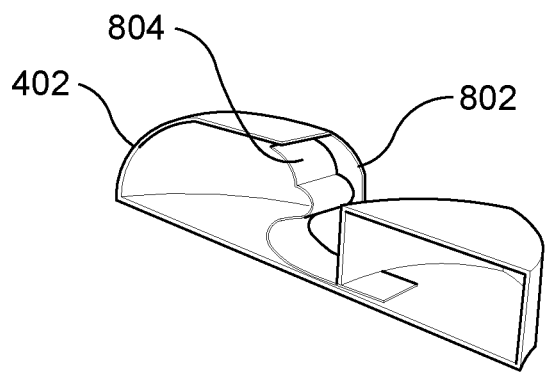

FIGS. 8A, 8B, and 8C illustrate various views of an exemplary mounting bracket 405, where FIG. 8A illustrates a top view of an exemplary mounting bracket 405, FIG. 8B illustrates a detailed perspective view of an exemplary mounting bracket 405, and FIG. 8C illustrates a sectioned view of an exemplary mounting bracket 405, in accordance with an embodiment of the present invention. In the present embodiment, a mounting bracket 405 may be operable to mount the holding apparatus 100 with the device 402 to a structure or surface. The mounting bracket 405 may include a slot 802 and a holding clip 804 within the slot 802. The hoop structure 125 may be pivotally positioned inside the slot 802. The holding clip 804 may secure the hoop structure 125 within the slot, allowing sufficient space for hinging. In some embodiments, the mounting bracket 405 may include a flat mounting surface and may adhere to any surface using various attachments, including, without limitation, epoxy, two sided tape, glues, adhesives, magnets, clips, hook and strap fasteners, and suction cups. In some embodiments, a frictional coating may be administered on the device cradle 105, the hoop structure 125, one surface of the easel 115, the mounting bracket 405, and a rear surface area of the T-junction 120. In some embodiments, the mounting bracket 405 may be included in the invention's final packaging, and/or may be packaged for retail sale as an individual accessory. In such latter variation, a various number of mounting brackets 405 may be included in individual packages.

In one embodiment of the present invention, a mounting bracket 405 may be operable to mount the holding apparatus 100 with a device 402 to a structure or surface. The mounting bracket 405 may include, without limitation, a slot 402 and a holding clip 404 within the slot 402. The hoop structure 125 may be pivotally positioned inside the slot 402. The holding clip 404 may secure the hoop structure 125 within the slot 402, allowing sufficient space for hinging. In some embodiments, a frictional coating may be administered on the device cradle 105, the hoop structure 125, the easel 115, the mounting bracket 405, and a rear surface area of the T-junction 120. The frictional coasting may be operable to inhibit friction between the components while also providing a low friction, abrasion resistant, and heat resistant surface on the surfaces. The frictional coating may include, without limitation, polytetrafluoroethylene, titanium nitride, aluminum magnesium boride, and electroles nickel. In some embodiments, the frictional coating may also be suitable to protect devices 402 contained in the holding apparatus 100.

Figure 9:
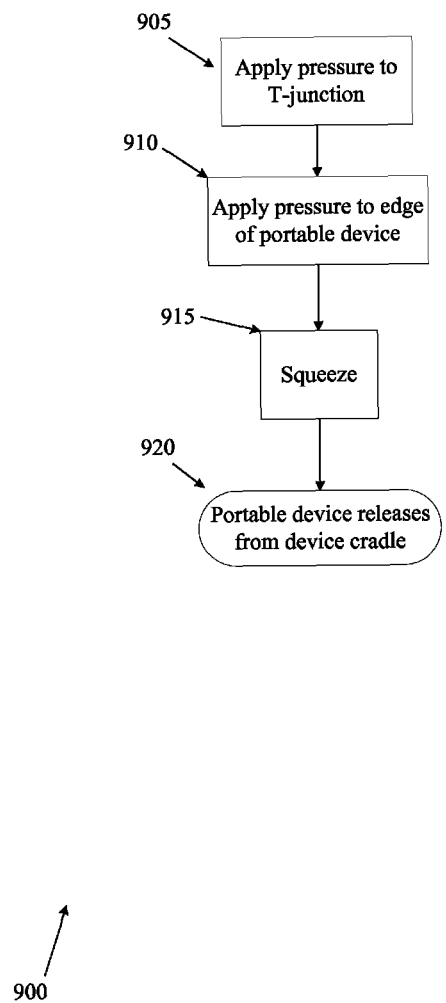
FIG. 9 illustrates an exemplary method for releasing a portable device 402 from a holding apparatus 100, in accordance with an embodiment of the present invention Unless otherwise indicated illustrations in the figures are not necessarily drawn to scale.

FIG. 9 illustrates an exemplary method for releasing a portable device 402 from a holding apparatus 100, in accordance with an embodiment of the present invention. In the present embodiment, a user may apply pressure to a proximate top of the T-junction 120 in a step 905. In this and other steps, pressure may be applied by any means, including, without limitation, a finger or any other part of a body or an object of any kind. In the present embodiment, a user may apply pressure to an edge of a portable device 402 while maintaining pressure on the T-junction in a step 910. The user may then squeeze, or apply added pressure to the T-junction 120 and the device 402 in a step 915. The device 402 may be released from the device cradle 105 in a step 920. In a non-limiting example, the users thumb goes on the top of the T-Junction, finger(s) go on exposed edge of hosted device, the user clinches hand and devices exits cradle right into hand.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of implementing a holding apparatus that holds a device while simultaneously rendering the device according to the present invention will be apparent to those skilled in the art. Various aspects of the invention have been described above by way of illustration, and the specific embodiments disclosed are not intended to limit the invention to the particular forms disclosed. The particular implementation of the holding apparatus that holds a device while simultaneously rendering the device operable may vary depending upon the particular context or application. By way of example, and not limitation, the holding apparatus that holds a device while simultaneously rendering the device operable described in the foregoing were principally directed to a U-shaped bracket the received an electronic device and a joined loop that clips the bracket onto a structure implementations; however, similar techniques may instead be applied to holding apparatuses for weapons and bullets, where the weapon may be stored and fired simultaneously, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   a device cradle being configured to removably retain a portable device, said device cradle comprising a generally u-shaped frame being configured to receive and substantially hold at least two or more peripheral sides of the portable device;
   an easel being configured into engagement with said cradle, said easel comprising lower attachment points being configured to substantially engage carrying apparatuses, said easel being further configured to substantially extend upward from a generally back bottom of said frame;
   a junction being configured into engagement with a top of said easel;
   a hoop structure being configured into engagement with said junction, said hoop structure being positionable to have a substantially spring-forward tension towards said easel to substantially form a clip in which said clip may significantly engage a structure and the portable device is removably secured significantly to the structure and
   a locking mechanism being configured for significantly retaining said hoop structure, said locking mechanism comprises at least a washer spring latch having at least one generally arching spring appendage, and at least one plunger device configured to substantially engage said arching spring appendage to generally release said locking mechanism.

2. The apparatus as recited in claim 1, in which said junction comprises a T-junction having a bottom portion being configured for engaging said easel and a top portion being configured for engaging said hoop structure, said top portion being generally pivotal relative to said bottom portion for selectively positioning of said hoop structure relative to said device cradle.

3. The apparatus as recited in claim 2, in which said hoop structure is positionable for substantially supporting the apparatus on a substantially horizontal surface.

4. The apparatus as recited in claim 2, in which said top portion is substantially pivotal about a formed hinge.

5. The apparatus as recited in claim 2, in which said T-junction further comprises a tension screw being configured for engagement with said locking mechanism.

6. The apparatus as recited in claim 5, in which said washer spring latch and said tension screw are positionable in said bottom portion of said T-junction.

7. The apparatus as recited in claim 2, in which said arching spring appendage substantially protrudes from an opening in said bottom portion of said T-junction, and said plunger device is positionable in said top portion of said T-junction.

8. The apparatus as recited in claim 1, further comprising a contact liner being configured to substantially engage an interior of said u-shaped frame to engage the peripheral sides of the portable device.

9. The apparatus as recited in claim 8, in which said u-shaped frame further comprises at least two or more slots substantially extending from said interior to an exterior, and said contact liner is further configured to substantially protrude though said slots wherein an application of force on said protruding contact liner is operable for activation of buttons on the peripheral sides of the portable device.

10. The apparatus as recited in claim 9, in which said contact liner comprises a flexible material for selective activation of a button.

11. The apparatus as recited in claim 1, further comprising at least one mounting bracket comprising a slot, a holding clip within said slot being configured to engage said hoop structure, and at least one surface being configured for engaging a flat surface of a structure wherein the apparatus is substantially supported on the structure.

12. The apparatus as recited in claim 11, in which said at least one surface comprises an adhesive.

13. An apparatus comprising:
   a device cradle being configured to removably retain a portable device, said device cradle comprising a generally u-shaped frame having at least two or more slots substantially extending from an interior to an exterior, and being configured to receive and substantially hold at least two or more peripheral sides of the portable device;
   a contact liner being configured to substantially engage said interior of said u-shaped frame to substantially engage the generally peripheral sides of the portable device, and to substantially protrude through said slots wherein an application of force on said protruding contact liner is operable for activation of buttons on said peripheral sides of the portable device;
   an easel being configured into engagement with said cradle, said easel comprising lower attachment points being configured to engage carrying apparatuses, said easel being further configured to substantially extend upward from a generally back bottom of said frame;

a T-junction being configured into engagement with a top of said easel, said T-junction comprising a bottom portion for substantially engaging a top of said easel, a top portion, said top portion being pivotal about a substantially formed hinge relative to said bottom portion, a tension screw being positionable in said formed hinge in said bottom portion, and a locking mechanism for substantially retaining said top portion in a selected position, said locking mechanism comprising at least a washer spring latch having an arching spring appendage, and a plunger device being configured to substantially engage said arching spring appendage to release said locking mechanism, said washer spring latch being positionable in said formed hinge in said bottom portion to substantially engage said tension screw with said arching spring appendage substantially protruding from an opening in said bottom portion, said plunger device being positionable in said top portion; and a hoop structure being configured into engagement with said top portion of said T-junction, said hoop structure being positionable in a first position, by selective positioning of said top portion, to have a generally spring-forward tension towards said easel to substantially form a clip in which said clip may engage a structure and the portable device is removably secured to the structure, and said hoop structure being positionable in a plurality of positions, by selective positioning of said top portion, to have at least one position for significantly supporting the apparatus on a substantially horizontal surface.

14. The apparatus as recited in claim 13, further comprising at least one mounting bracket comprising a slot, a holding clip within said slot being configured to substantially engage said hoop structure, and at least one surface being configured for engaging a flat surface of a structure wherein the apparatus is substantially supported on the structure.

15. The apparatus as recited in claim 14, in which said at least one surface comprises an adhesive.

16. The apparatus as recited in claim 13, in which said contact liner comprises a flexible material for selective activation of a button.

* * * * *